(12) United States Patent
Matsui (10) Patent No.: US 9,431,826 B2
(45) Date of Patent: Aug. 30, 2016

(54) DETERMINING THE POWER SUPPLY AND RECEIVE RELATIONSHIPS AMONG A PLURALITY OF DEVICES BASED UPON POWER CONSUMPTIONS OF EACH OF THE DEVICES

(71) Applicant: FUJI XEROX CO., LTD., Minato-ku, Tokyo (JP)

(72) Inventor: Haruki Matsui, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 567 days.

(21) Appl. No.: 13/660,269

(22) Filed: Oct. 25, 2012

(65) Prior Publication Data

US 2013/0311800 A1 Nov. 21, 2013

(30) Foreign Application Priority Data

May 21, 2012 (JP) .................................. 2012-115678

(51) Int. Cl.
*G06F 1/32* (2006.01)
*H02J 3/00* (2006.01)
*H02J 13/00* (2006.01)

(52) U.S. Cl.
CPC ............... *H02J 3/00* (2013.01); *G06F 1/3203* (2013.01); *H02J 13/00* (2013.01)

(58) Field of Classification Search
CPC ....................................................... G06F 1/32
USPC ......................................................... 713/320
See application file for complete search history.

(56) References Cited

U.S. PATENT DOCUMENTS

| 6,526,516 | B1 * | 2/2003 | Ishikawa ................. G06F 1/189 348/207.2 |
| 7,523,128 | B1 * | 4/2009 | Miller et al. |
| 8,707,309 | B2 | 4/2014 | Sakou |
| 2007/0203860 | A1 * | 8/2007 | Golden .................. G06Q 10/04 705/412 |
| 2010/0042857 | A1 * | 2/2010 | Zommer ....................... 713/320 |
| 2010/0306151 | A1 * | 12/2010 | Bickel .................... G01D 4/002 706/46 |
| 2011/0072289 | A1 * | 3/2011 | Kato .......................... G06F 1/26 713/324 |
| 2011/0218693 | A1 * | 9/2011 | Tsunoda et al. .............. 700/297 |

(Continued)

FOREIGN PATENT DOCUMENTS

| CN | 1224873 A | 8/1999 |
| CN | 100368958 C | 2/2008 |
| JP | 2006-349519 A | 12/2006 |

OTHER PUBLICATIONS

Japanese Unexamined Patent Application Publication No. 2006-349519, An English machine translation of this document, provided by the Japan Patent Office.

(Continued)

*Primary Examiner* — Thomas Lee
*Assistant Examiner* — Volvick Derose
(74) *Attorney, Agent, or Firm* — Sughrue Mion, PLLC (57) ABSTRACT

An information processing system includes an obtaining unit, a specifying unit, and an output unit. The obtaining unit obtains information indicating a state of the use of each of plural electrical apparatuses. The specifying unit specifies a power supply-and-receive relationship between the plural electrical apparatuses, on the basis of a change in power associated with the obtained information concerning each of the plural electrical apparatuses. The output unit outputs information indicating the power supply-and-receive relationship.

8 Claims, 10 Drawing Sheets

(56) References Cited

U.S. PATENT DOCUMENTS

| | | | |
|---|---|---|---|
| 2011/0270461 A1* | 11/2011 | Van Heuklon | G06F 11/3006 700/297 |
| 2012/0001740 A1* | 1/2012 | Doi et al. | 340/12.32 |
| 2012/0022711 A1* | 1/2012 | Sakaguchi | H02J 13/0017 700/295 |
| 2012/0068534 A1* | 3/2012 | Pan | H02J 4/00 307/26 |
| 2012/0072389 A1* | 3/2012 | Aldridge et al. | 706/54 |
| 2012/0150463 A1* | 6/2012 | Ozawa | G05B 15/02 702/62 |
| 2012/0173177 A1* | 7/2012 | Nishiyama | H02J 13/0017 702/62 |
| 2013/0054166 A1* | 2/2013 | Suzuki et al. | 702/62 |
| 2013/0065528 A1* | 3/2013 | Nagao | 455/41.2 |
| 2013/0111228 A1* | 5/2013 | Hashimoto | 713/300 |
| 2013/0124002 A1* | 5/2013 | Greene | G05B 15/02 700/296 |
| 2013/0173076 A1* | 7/2013 | Pan | H02J 3/14 700/292 |
| 2013/0274943 A1* | 10/2013 | Nojima | G01D 4/00 700/295 |
| 2013/0276001 A1* | 10/2013 | Oishi | G06F 9/542 719/318 |

OTHER PUBLICATIONS

Office Action issued by the Australian Patent Office in corresponding Australian Patent Application No. 2012250284, dated May 30, 2014.

Communication dated Dec. 11, 2015 from the Intellectual Property Office of the P.R. China issued in corresponding Application No. 201210525778.5.

* cited by examiner

| MEASUREMENT TIME | ELECTRICAL APPARATUS A [W] | ELECTRICAL APPARATUS B [W] | ELECTRICAL APPARATUS C [W] | ELECTRICAL APPARATUS D [W] | ELECTRICAL APPARATUS E [W] | ELECTRICAL APPARATUS F [W] | ELECTRICAL APPARATUS G [W] |
|---|---|---|---|---|---|---|---|
| 9:30:00 | 50000000 | 47400 | 0 | 0 | 100 | 3400 | 0 |
| 9:30:10 | 50000000 | 47400 | 0 | 0 | 100 | 3400 | 0 |
| 9:30:20 | 50000000 | 47400 | 0 | 0 | 100 | 3400 | 0 |
| 9:30:30 | 50000200 | 47400 | 200 | 0 | 100 | 3400 | 0 |
| 9:30:40 | 50000100 | 47400 | 100 | 0 | 100 | 3400 | 0 |
| 9:30:50 | 50000100 | 47400 | 100 | 0 | 100 | 3400 | 0 |
| 9:31:00 | 50000100 | 47400 | 100 | 0 | 100 | 3400 | 0 |
| 9:31:10 | 50000100 | 47400 | 100 | 0 | 100 | 3400 | 0 |
| 9:31:20 | 50000100 | 47400 | 100 | 0 | 100 | 3400 | 0 |
| 9:31:30 | 50000100 | 47400 | 100 | 0 | 100 | 3400 | 0 |
| 9:31:40 | 50000200 | 47400 | 100 | 100 | 100 | 3400 | 0 |
| 9:31:50 | 50000200 | 47400 | 100 | 100 | 100 | 3400 | 0 |
| 9:32:00 | 50000200 | 47400 | 100 | 100 | 100 | 3400 | 0 |
| 9:32:10 | 50000200 | 47400 | 100 | 0 | 100 | 3400 | 0 |
| 9:32:20 | 50000100 | 47400 | 100 | 0 | 100 | 3400 | 0 |

FIG. 2B

| MEASUREMENT TIME | ELECTRICAL APPARATUS A [W] | ELECTRICAL APPARATUS B [W] | ELECTRICAL APPARATUS C [W] | ELECTRICAL APPARATUS D [W] | ELECTRICAL APPARATUS E [W] | ELECTRICAL APPARATUS F [W] | ELECTRICAL APPARATUS G [W] |
|---|---|---|---|---|---|---|---|
| 9:32:30 | 50000100 | 47400 | 100 | 0 | 100 | 3400 | 0 |
| 9:32:40 | 50000100 | 47400 | 100 | 0 | 100 | 3400 | 0 |
| 9:32:50 | 50000100 | 47400 | 100 | 0 | 100 | 3400 | 0 |
| 9:33:00 | 50000100 | 47400 | 100 | 0 | 100 | 3400 | 0 |
| 9:33:10 | 50000100 | 47350 | 100 | 0 | 50 | 3350 | 0 |
| 9:33:20 | 50000100 | 47300 | 100 | 0 | 0 | 3300 | 0 |
| 9:33:30 | 50000100 | 47300 | 100 | 0 | 0 | 3300 | 0 |
| 9:33:40 | 50000100 | 47500 | 100 | 0 | 0 | 3500 | 0 |
| 9:33:50 | 50000100 | 47500 | 100 | 0 | 0 | 3500 | 0 |
| 9:34:00 | 50000200 | 47650 | 100 | 100 | 0 | 3500 | 150 |
| 9:34:10 | 50000200 | 47650 | 100 | 100 | 0 | 3500 | 150 |
| 9:34:20 | 50000200 | 47650 | 100 | 100 | 0 | 3500 | 150 |
| 9:34:30 | 50000200 | 47650 | 100 | 100 | 0 | 3500 | 150 |
| 9:34:40 | 50000200 | 47500 | 100 | 100 | 0 | 3500 | 0 |
| 9:34:50 | 50000200 | 47500 | 100 | 100 | 0 | 3500 | 0 |

| | ELECTRICAL APPARATUS A | ELECTRICAL APPARATUS B | ELECTRICAL APPARATUS C | ELECTRICAL APPARATUS D | ELECTRICAL APPARATUS E | ELECTRICAL APPARATUS F | ELECTRICAL APPARATUS G |
|---|---|---|---|---|---|---|---|
| ELECTRICAL APPARATUS A | — | 0 | 0 | 0 | 0 | 0 | 0 |
| ELECTRICAL APPARATUS B | 0 | — | 0 | 0 | 0 | 0 | 0 |
| ELECTRICAL APPARATUS C | 1 | 0 | — | 0 | 0 | 0 | 0 |
| ELECTRICAL APPARATUS D | 2 | 0 | 0 | — | 0 | 0 | 0 |
| ELECTRICAL APPARATUS E | 0 | 0 | 0 | 0 | — | 1 | 0 |
| ELECTRICAL APPARATUS F | 0 | 2 | 0 | 0 | 0 | — | 0 |
| ELECTRICAL APPARATUS G | 0 | 1 | 0 | 0 | 0 | 0 | — |

| MEASUREMENT TIME | ELECTRICAL APPARATUS A [W] | ELECTRICAL APPARATUS B [W] | ELECTRICAL APPARATUS C | ELECTRICAL APPARATUS D | ELECTRICAL APPARATUS E | ELECTRICAL APPARATUS F [W] | ELECTRICAL APPARATUS G |
|---|---|---|---|---|---|---|---|
| 9:30:00 | 50000000 | 47400 | OFF | OFF | ON | | OFF |
| 9:30:10 | 50000000 | 47400 | OFF | OFF | ON | 3400 | OFF |
| 9:30:20 | 50000000 | 47400 | OFF | OFF | ON | 3400 | OFF |
| 9:30:30 | 50000200 | 47400 | ON | OFF | ON | 3400 | OFF |
| 9:30:40 | 50000100 | 47400 | ON | OFF | ON | 3400 | OFF |
| 9:30:50 | 50000100 | 47400 | ON | OFF | ON | 3400 | OFF |
| 9:31:00 | 50000100 | 47400 | ON | OFF | ON | 3400 | OFF |
| 9:31:10 | 50000100 | 47400 | ON | OFF | ON | 3400 | OFF |
| 9:31:20 | 50000100 | 47400 | ON | OFF | ON | 3400 | OFF |
| 9:31:30 | 50000100 | 47400 | ON | ON | ON | 3400 | OFF |
| 9:31:40 | 50000200 | 47400 | ON | ON | ON | 3400 | OFF |
| 9:31:50 | 50000200 | 47400 | ON | ON | ON | 3400 | OFF |
| 9:32:00 | 50000200 | 47400 | ON | ON | ON | 3400 | OFF |
| 9:32:10 | 50000200 | 47400 | ON | OFF | ON | 3400 | OFF |
| 9:32:20 | 50000100 | 47400 | ON | OFF | ON | 3400 | OFF |

FIG. 6B

| MEASUREMENT TIME | ELECTRICAL APPARATUS A [W] | ELECTRICAL APPARATUS B [W] | ELECTRICAL APPARATUS C | ELECTRICAL APPARATUS D | ELECTRICAL APPARATUS E | ELECTRICAL APPARATUS F [W] | ELECTRICAL APPARATUS G |
|---|---|---|---|---|---|---|---|
| 9:32:30 | 50000100 | 47400 | ON | OFF | ON | 3400 | OFF |
| 9:32:40 | 50000100 | 47400 | ON | OFF | ON | 3400 | OFF |
| 9:32:50 | 50000100 | 47400 | ON | OFF | ON | 3400 | OFF |
| 9:33:00 | 50000100 | 47400 | ON | OFF | ON | 3400 | OFF |
| 9:33:10 | 50000100 | 47350 | ON | OFF | OFF | 3350 | OFF |
| 9:33:20 | 50000100 | 47300 | ON | OFF | OFF | 3300 | OFF |
| 9:33:30 | 50000100 | 47300 | ON | OFF | OFF | 3300 | OFF |
| 9:33:40 | 50000100 | 47500 | ON | OFF | OFF | 3500 | OFF |
| 9:33:50 | 50000100 | 47500 | ON | ON | OFF | 3500 | ON |
| 9:34:00 | 50000200 | 47650 | ON | ON | OFF | 3500 | ON |
| 9:34:10 | 50000200 | 47650 | ON | ON | OFF | 3500 | ON |
| 9:34:20 | 50000200 | 47650 | ON | ON | OFF | 3500 | ON |
| 9:34:30 | 50000200 | 47650 | ON | ON | OFF | 3500 | ON |
| 9:34:40 | 50000200 | 47500 | ON | ON | OFF | 3500 | OFF |
| 9:34:50 | 50000200 | 47500 | ON | ON | OFF | 3500 | OFF |

| ELECTRICAL APPARATUS A | 0 SECONDS |
|---|---|
| ELECTRICAL APPARATUS B | 0 SECONDS |
| ELECTRICAL APPARATUS C | 1 SECOND |
| ELECTRICAL APPARATUS D | 10 SECONDS |
| ELECTRICAL APPARATUS E | 0 SECONDS |
| ELECTRICAL APPARATUS F | 0 SECONDS |
| ELECTRICAL APPARATUS G | 0 SECONDS |

DETERMINING THE POWER SUPPLY AND RECEIVE RELATIONSHIPS AMONG A PLURALITY OF DEVICES BASED UPON POWER CONSUMPTIONS OF EACH OF THE DEVICES

CROSS-REFERENCE TO RELATED APPLICATIONS

This application is based on and claims priority under 35 USC 119 from Japanese Patent Application No. 2012-115678 filed May 21, 2012.

BACKGROUND (i) Technical Field

The present invention relates to an information processing system and method, and a non-transitory computer readable medium.

(ii) Related Art

These days, as part of measures for promoting energy conservation, analysis is conducted to observe how much each of electrical apparatuses in use influences the total power consumption.

SUMMARY

According to an aspect of the invention, there is provided an information processing system including: an obtaining unit that obtains information indicating a state of the use of each of plural electrical apparatuses; a specifying unit that specifies a power supply-and-receive relationship between the plural electrical apparatuses, on the basis of a change in power associated with the obtained information concerning each of the plural electrical apparatuses; and an output unit that outputs information indicating the power supply-and-receive relationship.

BRIEF DESCRIPTION OF THE DRAWINGS

An exemplary embodiment of the present invention will be described in detail based on the following figures, wherein.

DETAILED DESCRIPTION

An exemplary embodiment of the invention will be described below in detail with reference to the accompanying drawings.

Figure 1:
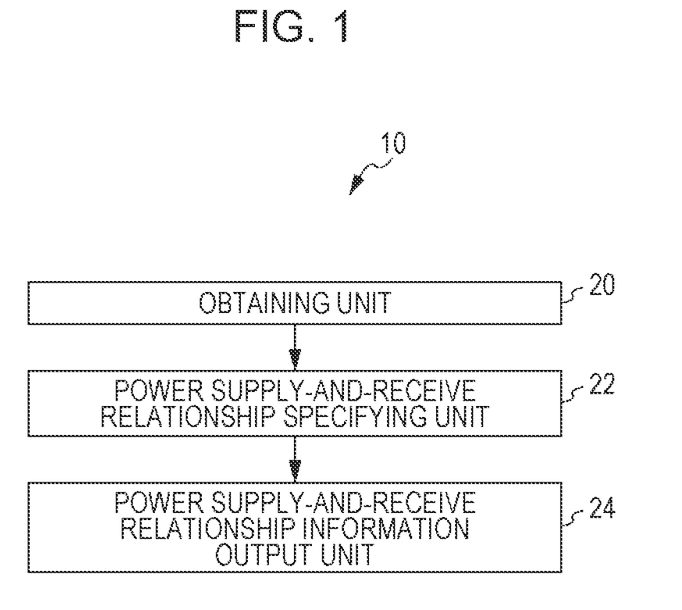
FIG. 1 is a functional block diagram illustrating examples of functions implemented by an information processing apparatus according to an exemplary embodiment of the invention.

FIG. 1 is a functional block diagram illustrating examples of functions implemented by an information processing apparatus 10 according to an exemplary embodiment. The information processing apparatus 10 is an example of an information processing system. As shown in FIG. 1, the information processing apparatus 10 includes, as its functions, an obtaining unit 20, a power supply-and-receive relationship specifying unit 22, and a power supply-and-receive relationship information output unit 24.

The information processing apparatus 10 of this exemplary embodiment is constituted by a computer including a controller, a storage unit, an input unit, and an output unit. The controller may be a program control device, such as a central processing unit (CPU), which operates in accordance with a program installed in the information processing apparatus 10. The storage unit may be a storage device, such as a read only memory (ROM) or a random access memory (RAM), or a hard disk drive. The input unit may be a mouse, a keyboard, or a microphone, and outputs the content of an operation performed by a user to the controller. The output unit may be a display or a speaker, and outputs information in accordance with an instruction output from the controller. The functions of the elements shown in FIG. 1 are implemented as a result of the controller of the information processing apparatus 10 executing a program which is installed in the information processing apparatus 10 and which includes instructions corresponding to the functions of the elements shown in FIG. 1. This program is supplied to the information processing apparatus 10 through the use of a computer readable information storage medium, such as an optical disc, a magnetic disk, magnetic tape, a magneto-optical disk, or a flash memory, or a communication medium, such as the Internet.

In this exemplary embodiment, power supply-and-receive relationships are specified for plural electrical apparatuses, such as distribution boards and personal computers. Additionally, in this exemplary embodiment, in each of plural electrical apparatuses for which power supply-and-receive relationships will be specified, measurements are conducted to observe the state in which the electrical apparatus is being used at predetermined regular intervals (e.g., at intervals of ten seconds starting at every hour). In this exemplary embodiment, power consumption (watt (W)) in an electrical apparatus is measured.

The obtaining unit 20 obtains information concerning the state in which each of plural electrical apparatuses is being used. In this exemplary embodiment, the obtaining unit 20 obtains information concerning power consumption measured at predetermined time intervals for each of plural electrical apparatuses for which power supply-and-receive relationships will be specified. Hereinafter, such information will be referred to as "power consumption information".

Figure 2A:
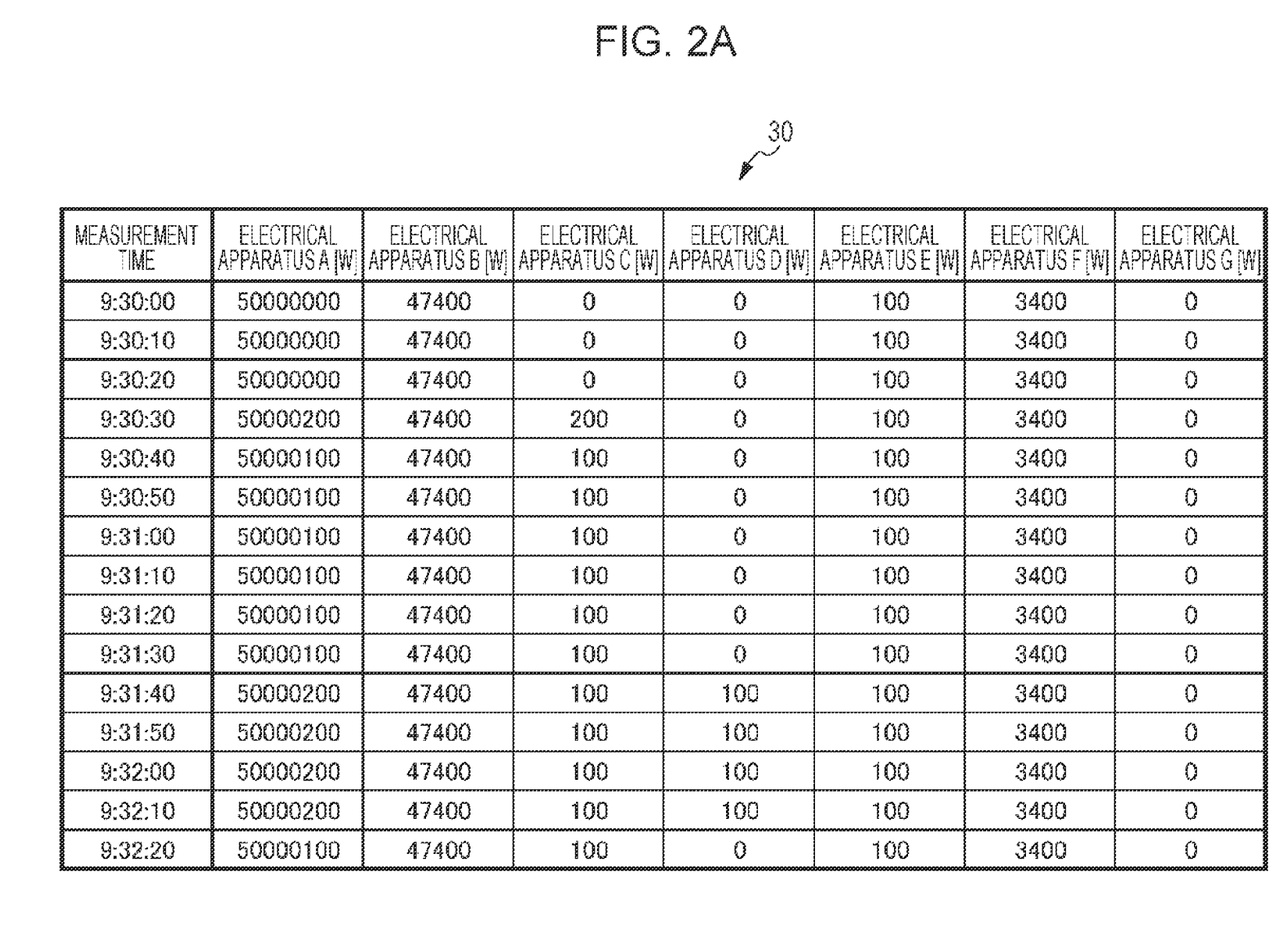
FIGS. 2A and 2B illustrate an example of list information.
Figure 2B:
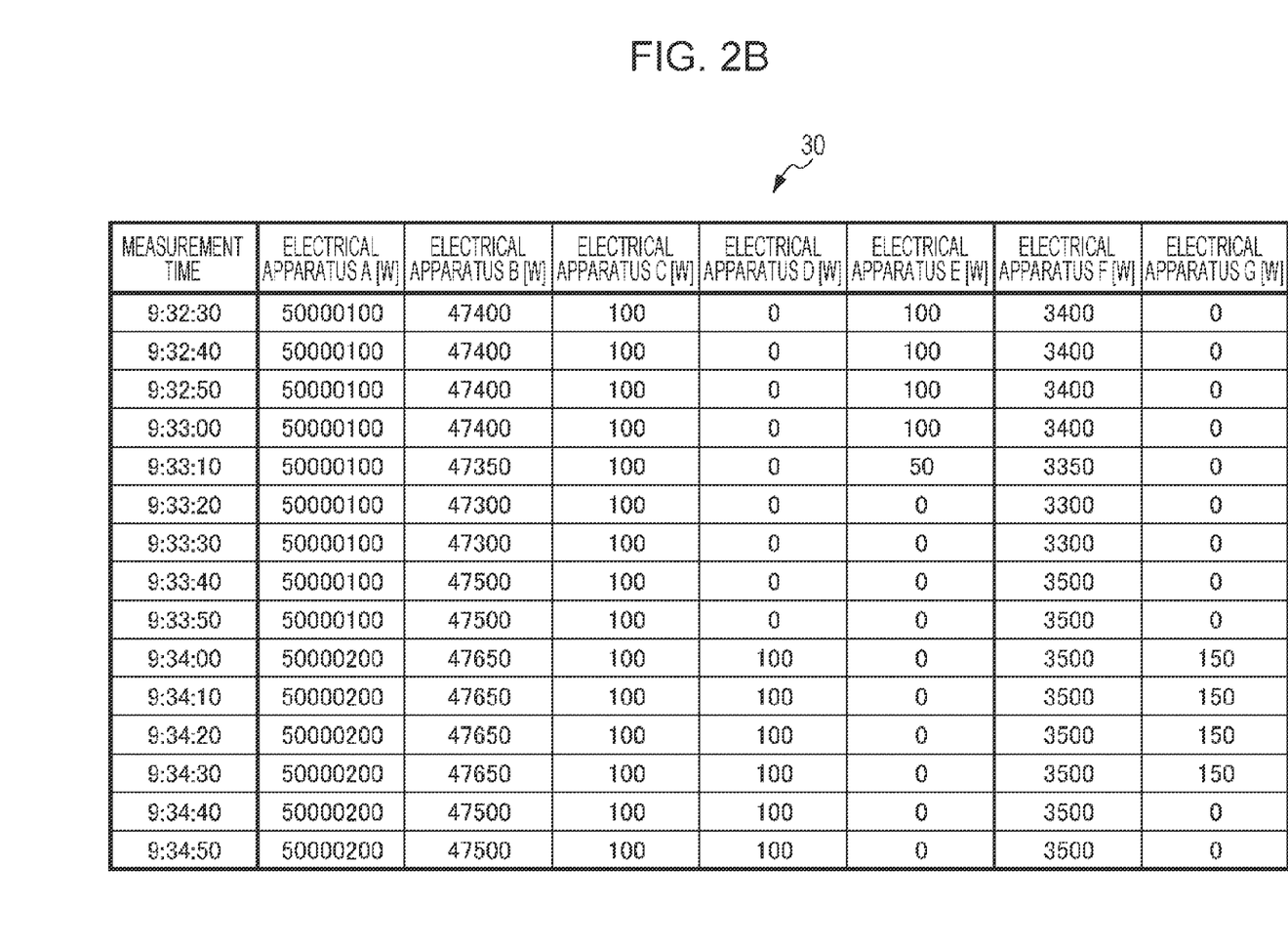

An example of list information 30 indicating a list of items of power consumption information obtained by the obtaining unit 20 is shown in FIGS. 2A and 2B. FIGS. 2A and 2B illustrate a list of items of power consumption information concerning power consumption measured for seven electrical apparatuses (electrical apparatus A, electrical apparatus B, electrical apparatus C, electrical apparatus D, electrical apparatus E, electrical apparatus F, and electrical apparatus G in the example shown in FIGS. 2A and 2B) at intervals of ten seconds during a time period from 9:30:00 to 9:34:50 on Jan. 25, 2011. An indication "Jan. 25, 2011" is not shown in FIGS. 2A and 2B.

The power supply-and-receive relationship specifying unit 22 specifies power supply-and-receive relationships for the plural electrical apparatuses, on the basis of information concerning the state in which each of the electrical apparatuses is being used (e.g., power consumption information in this exemplary embodiment).

An example of the flow of processing for specifying power supply-and-receive relationships among plural electrical apparatuses by the power supply-and-receive relationship specifying unit 22 will be described below with reference to the flowchart of FIG. 3.

Figure 4:
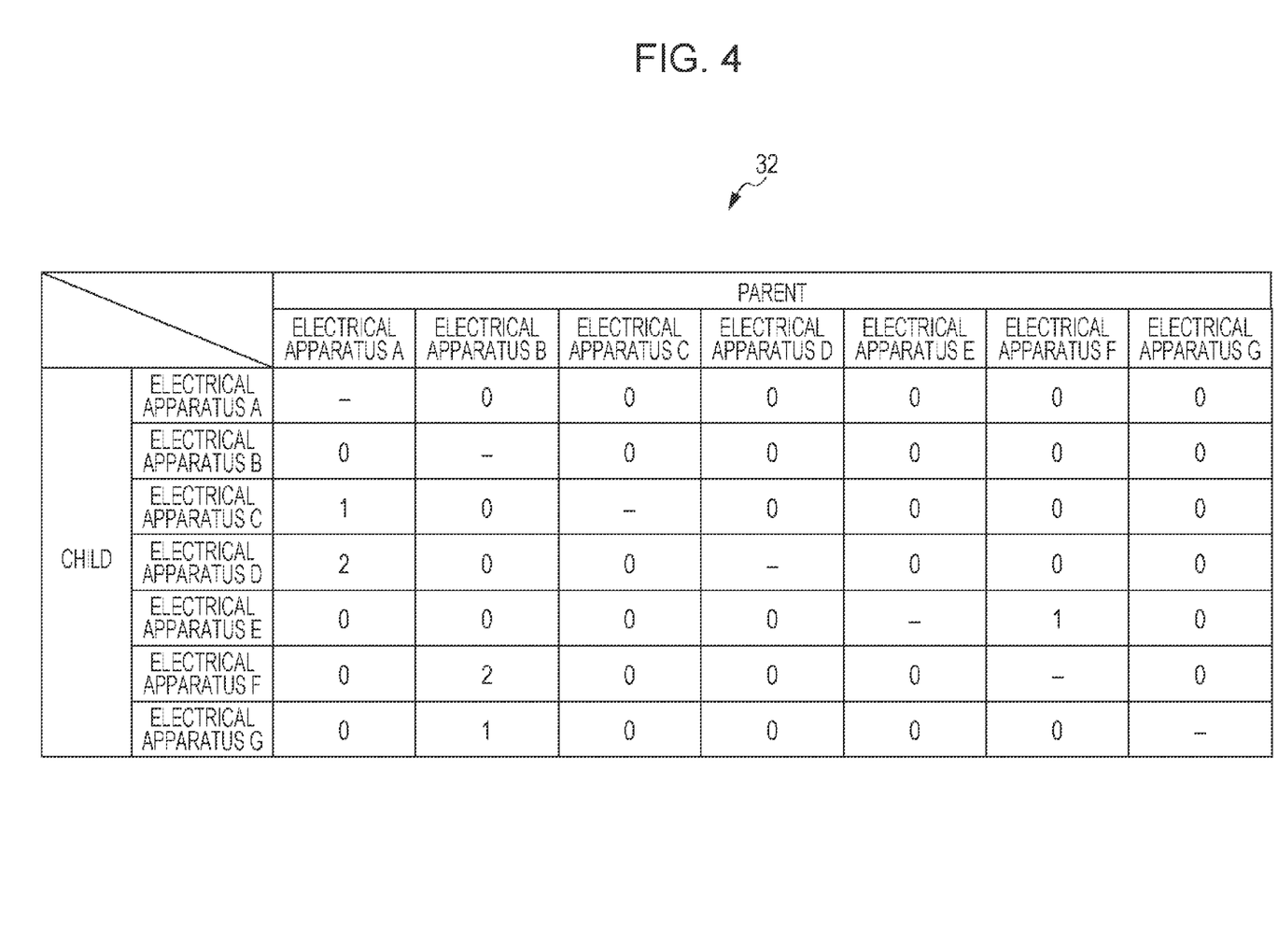
FIG. 4 illustrates an example of power supply-and-receive relationship basic information.

In this processing, power supply-and-receive relationship basic information 32, such as that shown in FIG. 4, is stored in advance in the storage unit of the information processing apparatus 10. FIG. 4 illustrates an example of the power supply-and-receive relationship basic information 32 at a time immediately before step S107. In the power supply-and-receive relationship basic information 32, values are set for ordered combinations (parent-child relationship combinations) of different electrical apparatuses. In this exemplary embodiment, in the power supply-and-receive relationship basic information 32, electrical apparatuses which supply power are indicated as parents, and electrical apparatuses which receive power are indicated as children. In the initial state, in the power supply-and-receive relationship basic information 32, the initial value 0 is set for combinations of different electrical apparatuses. Hereinafter, in the power supply-and-receive relationship basic information 32, the value set for a combination of a parent electrical apparatus (electrical apparatus M) and a child electrical apparatus (electrical apparatus N) will be referred to as "value P of a parent-child relationship score (electrical apparatus M and electrical apparatus N)".

In the following processing, the power supply-and-receive relationship specifying unit 22 specifies power supply-and-receive relationships among plural electrical apparatuses, on the basis of power consumption information concerning power consumption measured during a time period from 9:30:00 to 9:34:50 on Jan. 25, 2011, shown in FIGS. 2A and 2B.

In step S101, the power supply-and-receive relationship specifying unit 22 sets a given time t to a measurement start time (in this case, 9:30:00 on Jan. 25, 2011). Then, in step S102, the power supply-and-receive relationship specifying unit 22 determines whether the given time t is contained within a range from the measurement start time to the measurement end time (in this case, 9:34:50 on Jan. 25, 2011).

If the condition in step S102 is satisfied, i.e., if the result of step S102 is YES, the process proceeds to step S103. In step S103, the power supply-and-receive relationship specifying unit 22 determines whether the number of electrical apparatuses that satisfy a condition that the difference between the power consumption measured at a time immediately before the given time t and the power consumption measured at the given time t is contained within a predetermined range (e.g., a range from 20 to 30 W) is equal to or greater than a predetermined number (e.g., two). Hereinafter, the above-described difference in power consumption will be referred to as "power consumption change". Hereinafter, electrical apparatuses which satisfy the condition that the power consumption change is contained within a predetermined range will be referred to as "subject electrical apparatuses".

If the condition in step S103 is satisfied, i.e., if the result of step S103 is YES, the process proceeds to step S104. In step S104, the power supply-and-receive relationship specifying unit 22 determines whether the difference in the power consumption change between the subject electrical apparatuses is contained within a predetermined range (e.g., 5 W or smaller). In this case, if the number of subject electrical apparatuses is three or more, it is determined whether the difference between the largest power consumption change and the smallest power consumption change is contained within the predetermined range.

If the condition in step S104 is satisfied, i.e., if the result of step S104 is YES, the process proceeds to step S105. In step S105, the power supply-and-receive relationship specifying unit 22 updates the power supply-and-receive relationship basic information 32 in the following manner.

For example, if the number of subject electrical apparatuses is n (n is two or more), the value P of a parent-child relationship score (subject electrical apparatus having the m-th greatest power consumption value at the given time t and subject electrical apparatus having the (m+1)-th greatest power consumption value at the given time t) in the power supply-and-receive relationship basic information 32 is incremented by one (m is in a range of one to (n−1)). It is now assumed in step S103 that the two electrical apparatuses A and B are specified as subject electrical apparatuses and that the power consumption value of the electrical apparatus A at the given time t is greater than that of the electrical apparatus B at the given time t. In this case, in step S105, the power supply-and-receive relationship specifying unit 22 increments, by one, the value P of a parent-child relationship score (electrical apparatus A and electrical apparatus B) in the power supply-and-receive relationship basic information 32.

In step S105, if the value P of a parent-child relationship score to be incremented by one in the power supply-and-receive relationship basic information 32 is a predetermined upper limit value S, the power supply-and-receive relationship specifying unit 22 does not increment the value P of the parent-child relationship score. Additionally, in step S105, if the value P of a parent-child relationship score (electrical apparatus X and electrical apparatus Y) in the power supply-and-receive relationship basic information 32 is incremented by one, the power supply-and-receive relationship specifying unit 22 decrements, by one, the value P of a parent-child relationship score (electrical apparatus Z and electrical apparatus Y) in the power supply-and-receive relationship basic information 32. In this case, the electrical apparatus Z is different from either the electrical apparatus X or the electrical apparatus Y.

If the condition in step S103 is not satisfied, i.e., if the result of step S103 is NO, or if the condition in step S104 is not satisfied, i.e., if the result of step S104 is NO, or after step S105, the process proceeds to step S106. In step S106, the power supply-and-receive relationship specifying unit 22 advances the given time t by a predetermined measurement time interval dt (e.g., ten seconds). The process then returns to step S102.

If the condition in step S102 is not satisfied, i.e., if the result of step S102 is NO, the process proceeds to step S107. In step S107, the power supply-and-receive relationship specifying unit 22 specifies power supply-and-receive relationships among the plural electrical apparatuses on the basis of the power supply-and-receive relationship basic information 32, and generates power supply-and-receive relationship information indicating the specified power supply-and-receive relationships. The processing has then finished. In step S107, if the value P of a parent-child relationship score (electrical apparatus X and electrical apparatus Y) in the power supply-and-receive relationship basic information 32 is a predetermined value or greater (e.g., one or greater), the power supply-and-receive relationship specifying unit 22 generates supply-and-receive relationship information indicating that the electrical apparatus X supplies power to the electrical apparatus Y. In this exemplary embodiment, power supply-and-receive relationship information is generated for each of combinations of electrical apparatuses for which the value P of a parent-child relationship is a predetermined value or greater.

The power supply-and-receive relationship information output unit 24 outputs power supply-and-receive relationship information generated by the power supply-and-receive relationship specifying unit 22. In this exemplary embodiment, the power supply-and-receive relationship information output unit 24 outputs the power supply-and-receive relationship information generated by the power supply-and-receive relationship specifying unit 22 to, for example, the storage unit of the information processing apparatus 10.

Figure 5:
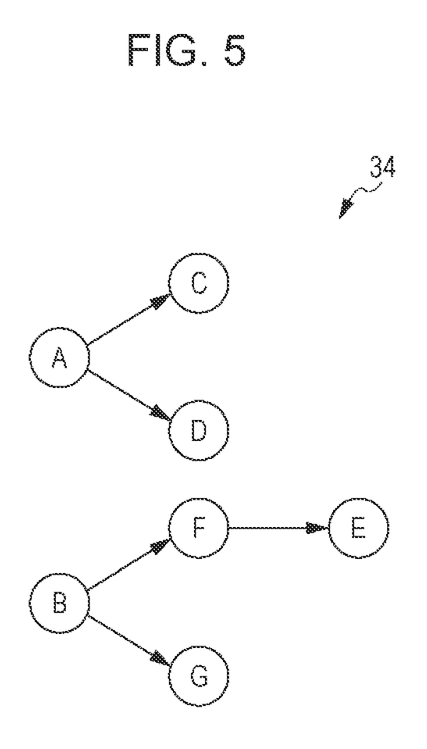
FIG. 5 illustrates an example of a power supply-and-receive relationship image.

In response to a request from a user, the information processing apparatus 10 of this exemplary embodiment also generates a power supply-and-receive relationship image 34, such as that shown in FIG. 5, on the basis of power supply-and-receive relationship information stored in the storage unit of the information processing apparatus 10, and then displays the power supply-and-receive relationship image 34 on a display.

For example, if the following items of power supply-and-receive relationship information: power supply-and-receive relationship information indicating that the electrical apparatus A is a power supply source for the electrical apparatus C, power supply-and-receive relationship information indicating that the electrical apparatus A is a power supply source for the electrical apparatus D, power supply-and-receive relationship information indicating that the electrical apparatus B is a power supply source for the electrical apparatus F, power supply-and-receive relationship information indicating that the electrical apparatus B is a power supply source for the electrical apparatus G, and power supply-and-receive relationship information indicating that the electrical apparatus F is a power supply source for the electrical apparatus E are stored in the storage unit of the information processing apparatus 10, the power supply-and-receive relationship image 34 shown in FIG. 5 is displayed on a display.

In the power supply-and-receive relationship image 34 shown in FIG. 5, alphabetical characters appended to electrical apparatuses are indicated in the circles. The tails of the arrows indicate alphabetical characters appended to electrical apparatuses which supply power, and the heads of the arrows indicate alphabetical characters appended to electrical apparatuses which receive power from the electrical apparatuses which supply power.

The power supply-and-receive relationship information stored in the storage unit of the information processing apparatus 10 is used for, for example, analyzing how much each of plural electrical apparatuses influences the total power consumption.

The present invention is not restricted to the above-described exemplary embodiment.

A modified example will be discussed below. For some of the electrical apparatuses for which power supply-and-receive relationships will be specified, the obtaining unit 20 may obtain, as information concerning the state in which each of the electrical apparatuses is being used, operating state information indicating the operating state (e.g., information indicating the value "ON" or "OFF") of each of the electrical apparatuses.

Figure 6A:
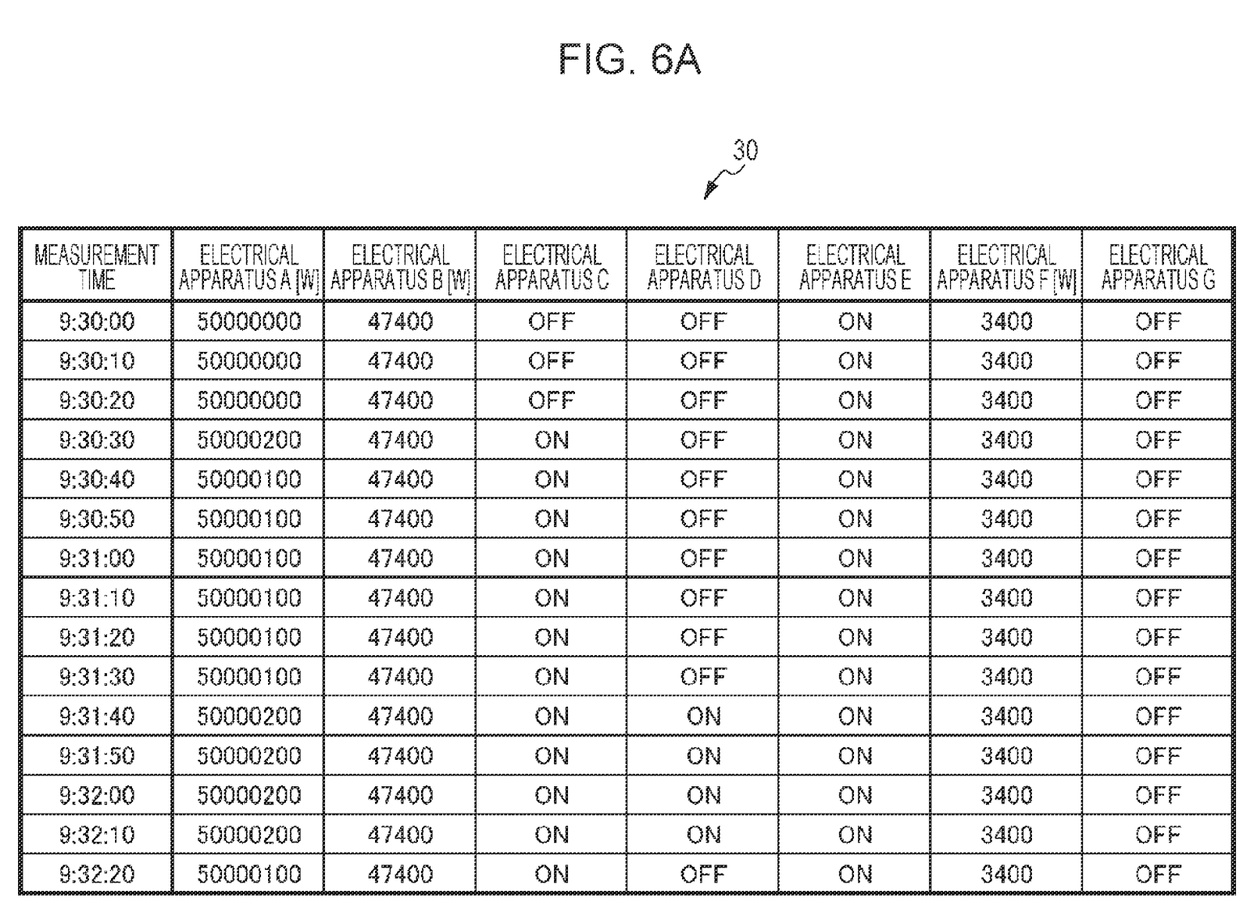
FIGS. 6A and 6B illustrate another example of list information.
Figure 6B:
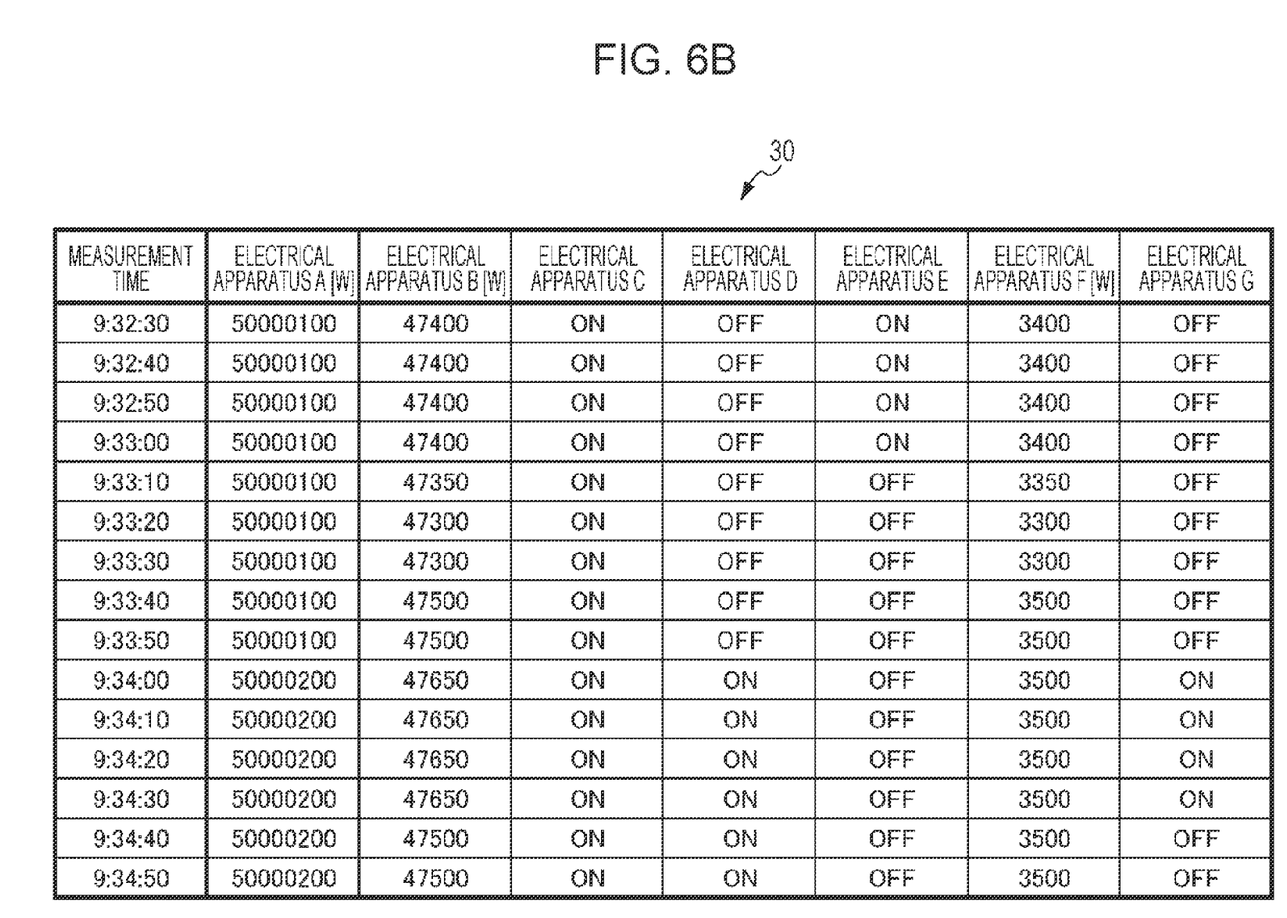

FIGS. 6A and 6B illustrate an example of list information 30 indicating a list of items of power consumption information and items of operating state information obtained by the obtaining unit 20. In the example of the list information 30 shown in FIGS. 6A and 6B, items of the power consumption information concerning the electrical apparatus A, the electrical apparatus B, and the electrical apparatus F and items of the operating state information concerning the electrical apparatus C, the electrical apparatus D, the electrical apparatus E, and the electrical apparatus G are shown.

Then, the power supply-and-receive relationship specifying unit 22 may convert the values indicating the items of the operating state information into associated power consumption values. In this case, the value "ON" may be converted into 50 W and the value "OFF" may be converted into 0 W. With this conversion, in the list information 30, the power consumption information is indicated for all the plural electrical apparatuses for which power supply-and-receive relationships will be specified. Then, the power supply-and-receive relationship specifying unit 22 may execute steps S101 through S107 and specify power supply-and-receive relationships for the plural electrical apparatuses.

Alternatively, the power supply-and-receive relationship specifying unit 22 may specify power supply-and-receive relationships among plural electrical apparatuses in the following manner, on the basis of the list information 30 shown in FIGS. 6A and 6B. In this case, steps of power supply-and-receive relationship specifying processing are similar to steps S101 through S107 shown in FIG. 3, except for steps S103 through S105.

After steps S101 and S102, in step S103, the power supply-and-receive relationship specifying unit 22 determines whether the following conditions (1-1) and (1-2) are satisfied: the condition (1-1) that there is only one electrical apparatus in which the value of the operating state information at a given time t is different from that at a time immediately before the given time t; and the condition (1-2) that the number of electrical apparatuses in which the difference between the power consumption measured at a time immediately before a given time t and the power consumption measured at the given time t is contained within a predetermined range is equal to or greater than a predetermined number (e.g., one). Hereinafter, an electrical apparatus that satisfies the condition (1-1) will be referred to as "first-type subject electrical apparatus", and an electrical apparatus that satisfies the condition (1-2) will be referred to as "second-type subject electrical apparatus".

In step S104, the power supply-and-receive relationship specifying unit 22 determines whether the following condition (2-1) or (2-2) is satisfied: the condition (2-1) that the number of second-type subject electrical apparatuses is one; or the condition (2-2) that, if the number of second-type subject electrical apparatuses is plural, the difference in the power consumption change between the second-type subject electrical apparatuses is contained within a predetermined range (e.g., 5 W or smaller). In this case, if the number of second-type subject electrical apparatuses is three or more, the difference between the largest power consumption change and the smallest power consumption change is calculated.

If the condition (2-1) or (2-2) is satisfied, in step S105, the power supply-and-receive relationship specifying unit 22 performs the following processing. If the number of first-type subject electrical apparatuses is one and the number of second-type subject electrical apparatuses is n−1 (n is one or more), the power supply-and-receive relationship specifying unit 22 increments, by one, the value P of a parent-child relationship score (second-type subject electrical apparatus having the m-th greatest power consumption value at the given time t and second-type subject electrical apparatus having the (m+1)-th greatest power consumption value at the given time t) in the power supply-and-receive relationship basic information 32 (m is in a range of one to (n−2)), and also, the power supply-and-receive relationship specifying unit 22 increments, by one, the value P of a parent-child relationship score (second-type subject electrical apparatus having the smallest power consumption at the given time t and first-type subject electrical apparatus).

As in the above-described exemplary embodiment, in step S105, if the value P of a parent-child relationship score to be incremented by one in the power supply-and-receive relationship basic information 32 is a predetermined upper limit value S, the power supply-and-receive relationship specifying unit 22 does not increment the value P of the parent-child relationship score.

Additionally, in step S105, if the value P of a parent-child relationship score (electrical apparatus X and electrical apparatus Y) in the power supply-and-receive relationship basic information 32 is incremented by one, the power supply-and-receive relationship specifying unit 22 decrements, by one, the value P of a parent-child relationship score (electrical apparatus Z and electrical apparatus Y) in the power supply-and-receive relationship basic information 32. In this case, the electrical apparatus Z is different from either the electrical apparatus X or the electrical apparatus Y.

Figure 3:
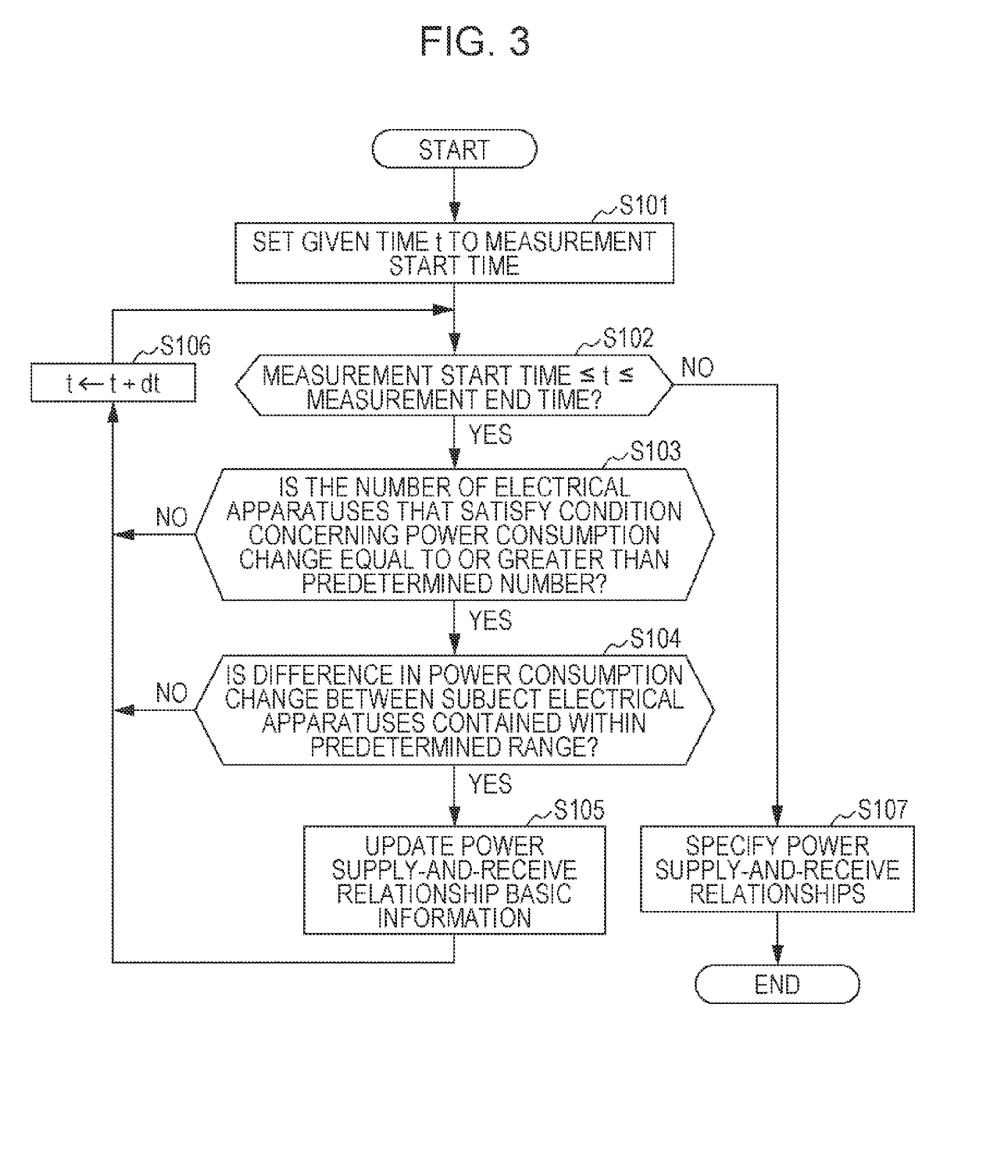
FIG. 3 is a flowchart illustrating an example of the flow of processing performed by an information processing apparatus.

As in the processing shown in FIG. 3, if the condition in step S103 is not satisfied, i.e., if the result of step S103 is NO, or if the condition in step S104 is not satisfied, i.e., if the result of step S104 is NO, or after step S105, the process proceeds to step S106. In step S106, the power supply-and-receive relationship specifying unit 22 advances the given time t by a predetermined measurement time interval dt (e.g., ten seconds). The process then returns to step S102.

If the condition in step S102 is not satisfied, i.e., if the result of step S102 is NO, in step S107, the power supply-and-receive relationship specifying unit 22 specifies power supply-and-receive relationships among the plural electrical apparatuses on the basis of the power supply-and-receive relationship basic information 32. The processing has then finished.

The present invention is not restricted to the above-described modified example.

Figure 7:
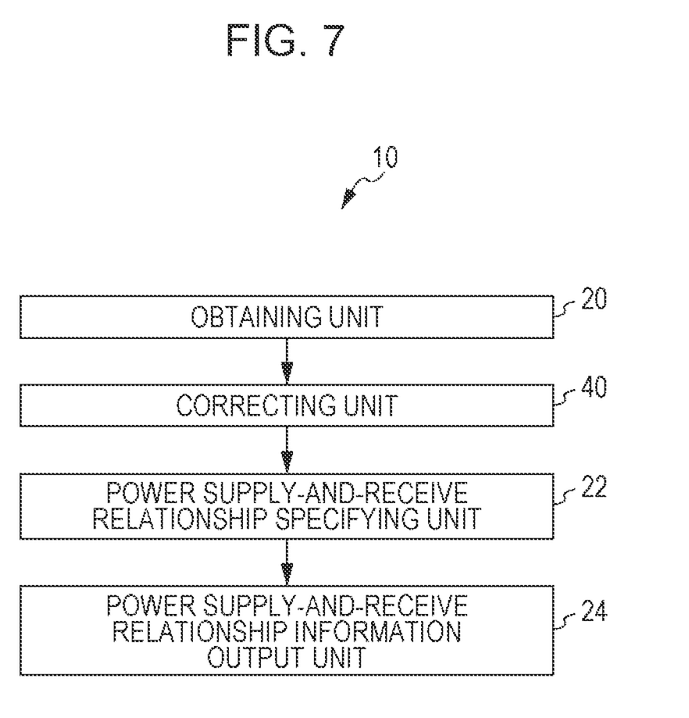
FIG. 7 is a functional block diagram illustrating examples of functions implemented by an information processing apparatus according to a modified example.

Another modified example will be discussed below. The information processing apparatus 10 of this exemplary embodiment may include, as shown in FIG. 7, a correcting unit 40 in addition to the obtaining unit 20, the power supply-and-receive relationship specifying unit 22, and the power supply-and-receive relationship information output unit 24. The functions of the elements shown in FIG. 7 are implemented as a result of the controller of the information processing apparatus 10 executing a program which is installed in the information processing apparatus 10 and which includes instructions corresponding to the functions of the elements shown in FIG. 7. This program is supplied to the information processing apparatus 10 through the use of a computer readable information storage medium, such as an optical disc, a magnetic disk, magnetic tape, a magneto-optical disk, or a flash memory, or a communication medium, such as the Internet.

The correcting unit 40 corrects the power consumption information or the operating state information obtained by the obtaining unit 20 for at least one of the value indicating the time at which each of the electrical apparatuses was used (in this exemplary embodiment, the measurement time at which the power consumption or the operating state was measured) and the value indicating the power consumption or the operating state. Two modes of correction operations performed by the correcting unit 40 will be discussed below.

Figure 8:
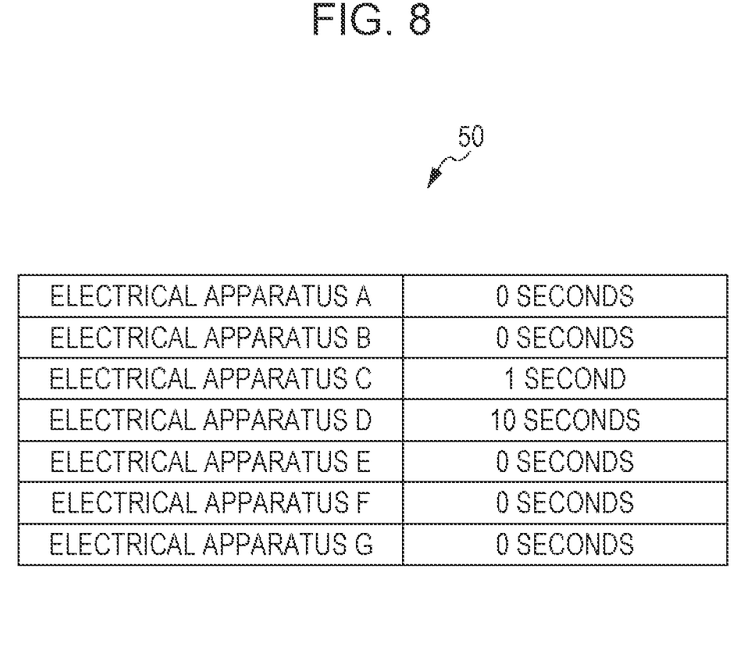
FIG. 8 illustrates an example of measurement time correction information.

In a first correction mode, the correcting unit 40 corrects the power consumption information or the operating state information obtained by the obtaining unit 20 for the value indicating the time at which each of the electrical apparatuses was used (in this exemplary embodiment, the measurement time), on the basis of measurement time correction information 50, such as that shown in FIG. 8. The measurement time correction information 50 is stored in advance in the storage unit of the information processing apparatus 10. More specifically, for an electrical apparatus in which the value of the measurement time correction information 50 is t_offset, the measurement time t is corrected to time t−t_offset. With this correction operation, even if the measurement time for an electrical apparatus is incorrect, it is corrected on the basis of the measurement time correction information 50.

In a second correction mode, if the measurement times in the power consumption information or the operating state information obtained by the obtaining unit 20 do not comply with a predetermined rule (e.g., if the measurements are not conducted at intervals of ten seconds starting at every hour), the correcting unit 40 corrects both of the measurement times and the power consumption values or the operating state values on the basis of approximate expressions, such as multiple moving average lines, so that the power consumption values or the operating state values can be associated with the correct measurement times complying with the above-described rule.

For example, if the power consumption information indicates that the power consumption value at a measurement time t1 is X1 W and the power consumption value at a measurement time t2 is X2 W, the correcting unit 40 determines the power consumption value at a measurement time t3 to be $(((t3-t1) \times X2 + (t3-t2) \times X1)/(t2-t1))$. More specifically, if the power consumption information indicates that the power consumption value at 9:30:21 on Jan. 25, 2011 is 44950 W and the power consumption value at 9:30:31 on Jan. 25, 2011 is 44900 W, the correcting unit 40 determines the power consumption value at 9:30:30 on Jan. 25, 2011 to be $(44950 \times 1 + 44900 \times 9)/10 = 44905$ W.

Concerning the operating state information, assuming that the value "ON" calculates to 50 W and the value "OFF" calculates to 0 W, if the value determined in accordance with the above-described expression is 25 W or greater, the correcting unit 40 determines the operating state value to be "ON", and if the value determined in accordance with the above-described expression is smaller than 25 W, the correcting unit 40 determines the operating state value to be "OFF".

In the second correction mode, even if there is an electrical apparatus for which the measurement times do not comply with a predetermined rule, power supply-and-receive relationships can be specified.

If correction has been conducted by the correcting unit 40 as described above, the power supply-and-receive relationship specifying unit 22 performs processing for specifying power supply-and-receive relationships on the basis of the corrected power consumption information or operating state information.

Modes of correction operations performed by the correcting unit 40 are not restricted to those described above. The correcting unit 40 may perform operations in accordance with one or both of the above-described two correction modes.

Additionally, the difference between the power consumption at each measurement time and the power consumption measured at the previous measurement time, i.e., the power consumption change, may be calculated in an electrical apparatus. In this case, the obtaining unit 20 may obtain information indicating power consumption changes, and the power supply-and-receive relationship specifying unit 22 may specify power supply-and-receive relationships among plural electrical apparatuses on the basis of the information indicating power consumption changes.

In the above-described exemplary embodiment, power supply-and-receive relationships among seven electrical apparatuses are specified. However, the number of electrical apparatuses for which power supply-and-receive relationships will be specified is not restricted to seven. Power supply-and-receive relationships may be specified for a greater number of (e.g., several thousand) electrical apparatuses by the application of the above-described exemplary embodiment.

The information processing apparatus 10 may be constituted by plural housings. Additionally, the above-described specific characters and numeric values and those in the drawings are only examples. In this exemplary embodiment, power supply-and-receive relationships among electrical apparatuses are specified by using power consumption in units of W. However, instead of W, another unit (e.g., current (A)) representing a change in the instantaneous state of every electrical apparatus may be used.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
   an obtaining unit configured to obtain information indicating a state of the use of each of a plurality of electrical apparatuses;
   a specifying unit configured to specify a power supply-and-receive relationship between the plurality of electrical apparatuses, on the basis of a change in power associated with the obtained information concerning each of the plurality of electrical apparatuses; and
   an output unit configured to output information indicating the power supply-and-receive relationship,
   wherein the specifying unit is further configured to determine, concerning a combination of electrical apparatuses having a power supply-and-receive relationship, an electrical apparatus having a larger level of power associated with the obtained information to be an electrical apparatus which supplies power, and determines an electrical apparatus having a smaller level of power associated with the obtained information to be an electrical apparatus which receives power, and
   wherein:
   the obtaining unit is configured to obtain information indicating power consumed in each of the plurality of electrical apparatuses; and
   the specifying unit is configured to specify a power supply-and-receive relationship between the plurality of electrical apparatuses, on the basis of power consumption indicated in the obtained information concerning each of the plurality of electrical apparatuses.

2. The information processing system according to claim 1, wherein the specifying unit specifies, among electrical apparatuses which satisfy a condition that the change in power has reached a predetermined amount, a combination of electrical apparatuses between which a difference in the change in power is contained within a predetermined range, and determines the specified combination of electrical apparatuses to be the combination of electrical apparatuses having a power supply-and-receive relationship.

3. The information processing system according to claim 1, further comprising:
   a correcting unit configured to correct at least one of information indicating a time of the use of each of the plurality of electrical apparatuses and information indicating the state of the use of the electrical apparatus at the time of the use of the electrical apparatus,
   wherein the obtaining unit obtains the information indicating the time of the use of each of the plurality of electrical apparatuses and the information indicating the state of the use of the electrical apparatus at the time of the use of the electrical apparatus, and the specifying unit specifies a power supply-and-receive relationship between the plurality of electrical apparatuses on the basis of the information corrected by the correcting unit.

4. The information processing system according to claim 2, further comprising:
   a correcting unit configured to correct at least one of information indicating a time of the use of each of the plurality of electrical apparatuses and information indicating the state of the use of the electrical apparatus at the time of the use of the electrical apparatus,
   wherein the obtaining unit obtains the information indicating the time of the use of each of the plurality of electrical apparatuses and the information indicating the state of the use of the electrical apparatus at the time of the use of the electrical apparatus, and the specifying unit specifies a power supply-and-receive relationship between the plurality of electrical apparatuses on the basis of the information corrected by the correcting unit.

5. An information processing method comprising:
   obtaining information indicating a state of the use of each of a plurality of electrical apparatuses;
   specifying a power supply-and-receive relationship between the plurality of electrical apparatuses, on the basis of a change in power associated with the obtained information concerning each of the plurality of electrical apparatuses; and
   outputting information indicating the power supply-and-receive relationship,
   wherein the specifying determines, concerning a combination of electrical apparatuses having a power supply-and-receive relationship, an electrical apparatus having a larger level of power associated with the obtained information to be an electrical apparatus which supplies power, and determines an electrical apparatus having a smaller level of power associated with the obtained information to be an electrical apparatus which receives power, wherein the obtaining obtains information indicating power consumed in each of the plurality of electrical apparatuses, and wherein the specifying specifies a power supply-and-receive relationship between the plurality of electrical apparatuses, on the basis of power consumption indicated in the obtained information concerning each of the plurality of electrical apparatuses.

6. A non-transitory computer readable medium storing a program causing a computer to execute a process, the process comprising:

obtaining information indicating a state of the use of each of a plurality of electrical apparatuses;

specifying a power supply-and-receive relationship between the plurality of electrical apparatuses, on the basis of a change in power associated with the obtained information concerning each of the plurality of electrical apparatuses; and outputting information indicating the power supply-and-receive relationship, wherein the specifying determines, concerning a combination of electrical apparatuses having a power supply-and-receive relationship, an electrical apparatus having a larger level of power associated with the obtained information to be an electrical apparatus which supplies power, and determines an electrical apparatus having a smaller level of power associated with the obtained information to be an electrical apparatus which receives power, wherein the obtaining obtains information indicating power consumed in each of the plurality of electrical apparatuses, and wherein the specifying specifies a power supply-and-receive relationship between the plurality of electrical apparatuses, on the basis of power consumption indicated in the obtained information concerning each of the plurality of electrical apparatuses.

7. The information processing system according to claim 1, wherein the specifying unit is configured to specify the power supply-and-receive relationship between the plurality of electrical apparatuses at a same point in time.

8. The information processing system according to claim 1, wherein the specifying unit is further configured to, in response to a number of the electrical apparatuses exhibiting a change in power consumption being greater than or equal to a predetermined number, updating the power supply-and-receive relationship if a difference between a change in power consumption of a first one of the electrical apparatuses exhibiting a largest power consumption change and a second one of the electrical apparatuses exhibiting a smallest power consumption change, is within a predetermined range.

* * * * *